April 26, 1938.  K. W. MONROE  2,115,034

PROCESS OF PREPARING AN ORGANIC PLASTIC COMPOSITION

Filed Dec. 14, 1933

INVENTOR.
Karl W. Monroe
BY
ATTORNEY.

Patented Apr. 26, 1938

2,115,034

UNITED STATES PATENT OFFICE 2,115,034

PROCESS OF PREPARING AN ORGANIC PLASTIC COMPOSITION

Karl W. Monroe, Arlington, N. J., assignor, by mesne assignments, to E. I. du Pont de Nemours & Company, Wilmington, Del., a corporation of Delaware Application December 14, 1933, Serial No. 702,273

3 Claims. (Cl. 106—40)

This invention relates to dental plate bases and to artificial dentures having plates of such bases. Dentures of the present invention embody, as a primary characteristic of the plate, a representation of the natural saliva-flecked gum of the human being. This effect is obtained by the plate carrying individually discernible particles, distinguishable in color from the body of the plate, and colored to match saliva. Preferably, and in particular accordance with the invention, this effect is obtained by a plate of cellulosic plastic, carrying distributed therethrough individual particles of a different cellulosic plastic representing saliva.

One object of the invention is to provide a dental plate base and artificial dentures embodying the same, having as their primary characteristic a representation of the natural saliva-flecked gum. A further object is to provide cellulosic plastic articles of this type. A further object is to provide a process for the manufacture of such dental plate base and dentures. To these ends, and also to improve generally on articles and processes of the general character indicated, the invention consists in the various matters hereinafter described and claimed.

Figure 1:
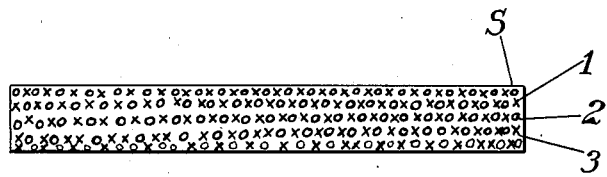
Figure 2:
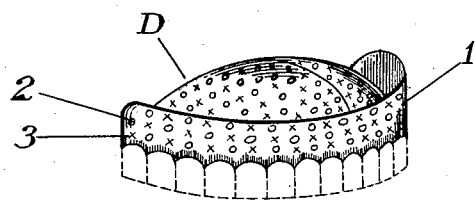

Without confining the invention thereto the same is illustrated by reference to the accompanying drawing, wherein Figure 1 is a highly conventionalized exaggerated cross-sectional view of cellulosic plastic dental plate base embodying the invention; and Figure 2 is a conventionalized perspective view of an artificial denture embodying the invention, the teeth being merely suggested in phantom lines for simplicity.

The objects of the invention are accomplished in the making of the dental plate base by mixing into the plastic body, when in a soft tenacious form in the character of a continuous "blanket", particles of plastic in hard powdered form, the latter being colored in imitation of saliva. Thus the body plastic may be a continuous body of soft cellulose nitrate plastic, and the particles be ground hard cellulose acetate plastic in the form of a powder. For the softening of the body plastic (aside from the effect that may be produced by any plasticizers present) is used a volatile solvent that, in practical result, is substantially without effect on the powder to be mixed in. In this way there is practical assurance that the powder will not become colloided into and indistinguishably blended with the body plastic. On the contrary, the powdered plastic will preserve its individuality and be present individually distributed, and individually discernible throughout the body plastic.

Without confining the invention thereto, the following, illustrating a cellulose nitrate body plastic with cellulose acetate "saliva" will serve as a specific example:—

Nitrocellulose plastic, e. g., (parts by weight) nitrocellulose 100, plasticizer, e. g., triacetin 34, volatile solvent practically without effect on relatively dry cellulose acetate plastic and in quantity to maintain the nitrocellulose plastic "soft" on the rolls, e. g., denatured alcohol (Formula 2B) 75, and any desired stabilizing material desired, is prepared in the usual way by mixing and rolling. For opacity there may be used e. g., titanium oxide 25 grams per 100 pounds of cellulose nitrate, and for "gum color" (a shade of pink) approximately 10 grams of Cadmium Red 3562 and approximately 2 grams of Cadmium Red 2429, per 100 pounds of nitrocellulose. The opaque pigment and stabilizer are mixed in the mixer and the red pigments are mixed in on the rolls during the early stages of the rolling, when the plastic has been initially colloided, and thoroughly and evenly distributed in the plastic during the rolling.

Cellulose acetate plastic in comminuted form and imitative of saliva is prepared by making a batch of plastic containing e. g., (parts by weight) cellulose acetate 100, plasticizer e. g., dimethyl phthalate 33, denatured alcohol (Formula 2B) 20, commercial ethyl acetate 32, and acetone 20, these being mixed and rolled in the usual way of the art. Opaque pigment, e. g., titanium oxide 3200 grams per 100 pounds of cellulose acetate is added in the mixing. For the saliva coloring there is mixed in on the rolls, 32 grams c. p. chrome yellow, 64 grams chrome orange and 16 grams spectra black paste per 100 pounds of cellulose acetate. After the addition of the pigments, the rolling of the batch is continued until the solvent content is so far reduced that the plastic is, in the terms of the art, "hard", e. g., contains not over approximately 6% solvent. The batch is then removed from the rolls in sheets of convenient thickness for grinding. I have found sheets 0.030 inch to be of a desirable thickness for ready grinding, although it will be understood that sheets of other thicknesses can be used. These sheets are then seasoned in a warm place until the solvent is not over approximately 1%. The batch is now ground to a fine powder in any commercial grinder that will produce particles of sufficiently small size. For ready mixing into the body plastic, and for the obtaining of proper effects, I have found it desirable to use a powder that will pass through an 80-90 mesh screen and will be retained on a 100 mesh screen, but obviously, if for any reason it be desired, powders coarser or finer than this, may be used.

The powder is now mixed into the body of cellulose nitrate plastic which is, in the terms of the art, "on the soft side" at the time that the incorporation of the powder is started, that is, the plastic contains approximately 18% of solvent. There are used 270 grams of the powder for each 100 pounds of cellulose nitrate, i. e., for each amount of the cellulose nitrate plastic containing 100 pounds of cellulose nitrate. The incorporation of the powder may be carried on in any of the approved ways known to the art for incorporating pigment in plastics. Preferably it is done by rolling the sheets in the usual rolling mill of the plastics art and incorporating the powders during this rolling. I have found it convenient to moisten the powder with a liquid that is a non-solvent for the plastics being manipulated, both the cellulose nitrate plastic and the cellulose acetate powder. For example, I may use toluol.

When the powder has been thoroughly incorporated in and fully distributed through the nitrocellulose plastic, to give the ultimate effect desired (the plastic being re-rolled as often as is necessary to secure this effect) the plastic, now in practical effect pigmented with individual, separately distinguishable (in large part), and spaced-apart particles of cellulose acetate plastic in powdered form, is drawn from the rolls in slab form. These slabs, desirably about ½ inch or more in thickness, are stacked in a baking press, and composited into a unitary block under heat and pressure according to the usual procedure of the art. As is well understood such a press embodies a chase for containing the stacked plastic, a ram for applying pressure and provisions for heating and cooling the plastic by means of hot and cold water so as to cause the slabs to coalesce and form a solid cake. From the finished cake are shaved sheets of finished plastic, in the usual way of the art, for dental plate base, for example 0.250-0.500 inch thick.

For the making of the artificial denture a blank is blanked from a sheet of the plastic dental plate base and molded into shape for the particular mouth, and carrying the necessary teeth, in any of the ordinary ways of dental mechanics for manipulating thermoplastic denture material. With the particular plastic described in detail above, a molding pressure of several thousand pounds per square inch and a temperature of 115° C. is desirable. The resulting denture is odorless, tasteless, unaffected by continuous contact of moisture, weak acids and alkalies, and mechanically strong; and the plastic permits molding of the denture to accurate and intricate form and gives a denture capable of repeated repair by re-molding.

In the drawing in Figure 1 is illustrated a sheet S embodying the present invention, and in Figure 2 is illustrated a denture D. Each comprises the body plastic 1, and the individual particles 2 therein imitative of saliva. The plastic is illustrated as also containing individual particles 3, of somewhat darker color than the body plastic, to assist in giving a light-and-shade effect.

In respect to the particles 3, while their use is not essential to the invention in so far as it relates to the obtaining of a saliva effect, the naturalness of the denture is improved by their presence. Preferably they are also of cellulose acetate powder, and conveniently the powder is prepared and mixed in at the time of preparing and mixing in the powder for the saliva effect. The original batch of cellulose acetate plastic is made sufficiently large to provide for the making of two colors of powder and is divided into two equal parts after mixing and prior to rolling. While one part is colored to represent saliva as above described, the other part is colored by mixing in, on the rollers, 1280 grams of Cadmium Red 3562 per 100 pounds of cellulose acetate in the mass. This is then rolled, sheeted and ground as described above, and incorporated with the cellulose nitrate plastic at the same time as the "saliva" powder. There are used 270 grams of the dark red powder per 100 pounds of cellulose nitrate, no change in the amount of "saliva" powder (270 grams) being necessary.

While the invention has been described in particular reference to the use of cellulose acetate and cellulose nitrate, it will be understood that other cellulosic derivatives may be used if desired. It is generally desirable to use cellulose acetate for the particles, as 2, since of the cellulose derivative plastics, cellulose acetate plastic is particularly adapted for the production of powders as the plastic dries very hard, rendering it well capable of grinding. In the selection of a solvent, or solvents, for the softening of the body plastic many different solvents may be used, the invention not being restricted to the use of ethyl alcohol referred to in the above example. It is only necessary that the solvent used in the body plastic shall not be, in practical effect, a solvent for the particles, as 2 and 3. In this connection, it will be understood by those skilled in the art that the solubility of cellulosic derivatives varies with the degree of esterification or etherification, and the solubility of a cellulosic plastic varies with its hardness, so that in any particular case the solvent used for softening the body plastic may be readily selected for its non-effect on the particles.

While in the cellulose nitrate composition of the above example, triacetin is used as a plasticizer, and dimethyl phthalate is used in the cellulose acetate composition, it will be understood that many other plasticizers may be used, the invention not being primarily concerned with any particular plasticizer, further than that it is desirable to use plasticizers that are free from properties, such as odor and taste, that would be in any way harmful for dentures. Camphor is entirely satisfactory as a plasticizer for cellulose nitrate, but does possess an odor, and when used for dental purposes has been reported to possess a taste, which is objectionable in some cases. While titanium oxide has been mentioned as the pigment for imparting opacity, obviously many other pigments may be used. Similarly, for the color-imparting pigments may be substituted many others for the particular color effects desired; and also dyestuffs may be used.

In certain cases it may be found of advantage to incorporate the particles of e. g., cellulose acetate by sprinkling them on the blank so that they will be pressed therein during the molding of the denture, a blank previously without, or with insufficient particles being used. However, generally speaking, I find the products of this procedure less satisfactory than those of the method described in detail above. Also, although the invention has been particularly described with reference to cellulosic materials, it will be understood that it does not exclude cases wherein the body of the dental plate base and/or the individually discernible particles for "saliva" and/or for light and shade effect may be of any other suitable materials, as of suitable gums and resins whether natural or synthetic e. g., vinyl resin and phenol formaldehyde resin; as vinyl resin particles with a cellulose acetate plastic base, or vice versa, or a phenol formaldehyde resin base with vinyl resin particles, and so on.

I claim:

1. Process of preparing an organic plastic composition pigmented with individual, separately distinguishable particles and which plastic is adapted for use in making dental plates, comprising forming a hard dry organic plastic composition substantially white in color and opaque, reducing same to granular particles of the order of 80–100 mesh size, thoroughly distributing said particles in a batch of soft, gum colored plastic composition having different solubility characteristics from said first plastic composition and containing a volatile solvent in sufficient proportion to keep the batch of plastic soft, said solvent being substantially a non-solvent for said first plastic composition, and reducing the solvent content of said batch of gum colored plastic composition.

2. Process of preparing an organic plastic composition pigmented with individual, separately distinguishable particles and which plastic is adapted for use in making dental plates, comprising forming a hard, dry cellulose acetate plastic substantially white in color and opaque, reducing same to granular particles of the order of 80–100 mesh size, thoroughly distributing said particles in a batch of a soft gum colored cellulose nitrate plastic containing a volatile solvent for the cellulose nitrate in sufficient proportion to keep the plastic soft, said solvent being substantially a non-solvent for cellulose acetate, and reducing the volatile solvent content of said batch of gum colored cellulose nitrate plastic.

3. Process of preparing an organic plastic composition pigmented with individual, separately distinguishable particles and which plastic is adapted for use in making dental plates, comprising forming a hard dry cellulose acetate plastic substantially white in color and opaque, reducing same to granular particles of the order of 80–100 mesh size, thoroughly distributing said particles in a batch of a soft gum colored plastic comprising cellulose nitrate, a plasticizer therefor, and a volatile solvent therefor, said solvent amounting to about 18% by weight of the batch and being substantially a non-solvent for the hard dry particles, the hard dry particles being used in approximately the proportion of one part to every 168 parts of cellulose nitrate in the batch, and reducing the volatile solvent content of said batch of gum colored plastic.

KARL W. MONROE.